United States Patent
Safford et al.

(10) Patent No.: US 7,287,185 B2
(45) Date of Patent: Oct. 23, 2007

(54) ARCHITECTURAL SUPPORT FOR SELECTIVE USE OF HIGH-RELIABILITY MODE IN A COMPUTER SYSTEM

(75) Inventors: Kevin David Safford, Fort Collins, CO (US); Donald Charles Soltis, Jr., Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 525 days.

(21) Appl. No.: 10/819,241

(22) Filed: Apr. 6, 2004

(65) Prior Publication Data

US 2005/0240793 A1 Oct. 27, 2005

(51) Int. Cl.
*G06F 11/00* (2006.01)
(52) U.S. Cl. .............................. 714/11; 714/10; 714/12
(58) Field of Classification Search .................. 714/12, 714/10, 11
See application file for complete search history.

(56) References Cited

U.S. PATENT DOCUMENTS

| | | | |
|---|---|---|---|
| 5,434,997 A | 7/1995 | Landry et al. | |
| 5,664,214 A * | 9/1997 | Taylor et al. | 712/20 |
| 6,499,048 B1 | 12/2002 | Emrys | |
| 6,615,366 B1* | 9/2003 | Grochowski et al. | 714/10 |
| 6,640,313 B1* | 10/2003 | Quach | 714/10 |
| 6,760,634 B2* | 7/2004 | Cook et al. | 700/82 |
| 6,760,832 B2 | 7/2004 | Nishimoto et al. | |

(Continued)

FOREIGN PATENT DOCUMENTS

| | | |
|---|---|---|
| WO | WO94/08293 | 4/1994 |
| WO | WO02/084490 | 10/2002 |

OTHER PUBLICATIONS

Intel Itanium Architecture Software Developer's Manual, vol. 3: Instruction Set Reference, Revision 2.1, Oct. 2002, Part 1, Chapter 3, http://www.intel.com/design/itanium/manuals/iiasdmanual.htm#instruction.
Intel Itanium Architecture Software Developer's Manual, vol. 3: Instruction Set Reference, Revision 2.1, Oct. 2002, Part 2, Chapter 2, http://www.intel.com/design/itanium/manuals/iiasdmanual.htm#instruction.

(Continued)

*Primary Examiner*—Robert Beausoliel
*Assistant Examiner*—Yolanda L Wilson

(57) ABSTRACT

In one aspect of the present invention, a circuit is provided which implements an instruction set architecture defining a first instruction group, a second instruction group to enter a high-reliability mode of operation, and a third instruction group to enter a non-high-reliability mode of operation. The circuit includes means for causing the circuit to enter the high-reliability mode of operation in response to receiving the second instruction group; means for causing the circuit to enter the non-high-reliability mode of operation in response to receiving the third instruction group; first execution means for executing the first instruction group in the high-reliability mode of operation if the circuit is in the high-reliability mode of operation; and second execution means for executing the first instruction group in the non-high-reliability mode of operation if the circuit is in the non-high-reliability mode of operation.

15 Claims, 7 Drawing Sheets

U.S. PATENT DOCUMENTS

| | | |
|---|---|---|
| 6,772,368 B2 * | 8/2004 | Dhong et al. .................. 714/11 |
| 6,970,988 B1 | 11/2005 | Chung |
| 7,017,073 B2 | 3/2006 | Naier |
| 2001/0034824 A1 | 10/2001 | Mukherjee |
| 2001/0034854 A1 | 10/2001 | Mukherjee |
| 2002/0133745 A1 | 9/2002 | Okin |
| 2002/0144177 A1 | 10/2002 | Kondo et al. |
| 2002/0157044 A1 | 10/2002 | Byrd |
| 2003/0135711 A1 | 7/2003 | Shoemaker et al. |
| 2005/0108509 A1 | 5/2005 | Safford |
| 2005/0240793 A1 | 10/2005 | Safford |

OTHER PUBLICATIONS

Intel Itanium Architecture Software Developer's Manual, vol. 1: Application Architecture, Revision 2.1, Oct. 2002, Part 1, Chapter 4, http://www.intel.com/design/itanium/manuals/iiasdmanual.htm#instruction.

* cited by examiner

| | 127 | 87 86 | 46 45 | 5 4 | 0 |
|---|---|---|---|---|---|
| | INST SLOT 2 702d | INST SLOT 1 702c | INST SLOT 0 702b | TEMPLATE 702a | |

| | 127 | 87 86 | 46 45 | 5 4 | 0 |
|---|---|---|---|---|---|
| | I-UNIT 712d | M-UNIT 712c | M-UNIT 712b | 08 712a | |

ARCHITECTURAL SUPPORT FOR SELECTIVE USE OF HIGH-RELIABILITY MODE IN A COMPUTER SYSTEM

CROSS REFERENCE TO RELATED APPLICATIONS

This application is related to the following co-pending and commonly-owned patent applications, where are hereby incorporated by reference:

U.S. patent application Ser. No. 10/714,093, filed on Nov. 14, 2003, entitled "Error Detection Method and System for Processors that Employ Lockstepped Concurrent Threads,";

U.S. patent application Ser. No. 10/714,258, filed on Nov. 14, 2003, entitled "Error Detection Method and System for Processors that Employ Alternating Threads,"; and the following commonly-owned and concurrently-filed patent applications, which are hereby incorporated by reference:

"Voltage Modulation for Increased Reliability in an Integrated Circuit," U.S. patent application Ser. No. 10/818,974;

"Lockstep Error Signaling", U.S. patent application Ser. No. 10/818,993;

"Core-Level Processor Lockstepping", U.S. patent application Ser. No. 10/818,975; and "Off-Chip Lockstep Checking", U.S. patent application Ser. No. 10/818,994.

BACKGROUND

The present invention relates to computer system design and, more particularly, to techniques for decreasing the susceptibility of a computer system to soft errors.

Cosmic rays or alpha particles that strike a silicon-based device, such as a microprocessor, can cause an arbitrary node within the device to change state in unpredictable ways, thereby inducing what is referred to as a "soft error." Microprocessors and other silicon-based devices are becoming increasingly susceptible to soft errors as such devices decrease in size. Soft errors are transient in nature and may or may not cause the device to malfunction if left undetected and/or uncorrected. An uncorrected and undetected soft error may, for example, cause a memory location to contain an incorrect value which may in turn cause the microprocessor to execute an incorrect instruction or to act upon incorrect data.

One response to soft errors has been to add hardware to microprocessors to detect soft errors and to correct them, if possible. Various techniques have been employed to perform such detection and correction, such as adding parity-checking capabilities to processor caches. Such techniques, however, are best at detecting and correcting soft errors in memory arrays, and are not as well-suited for detecting and correcting soft errors in arbitrary control logic, execution datapaths, or latches within a microprocessor. In addition, adding circuitry for implementing such techniques can add significantly to the size and cost of manufacturing the microprocessor.

One technique that has been used to protect arbitrary control logic and associated execution datapaths is to execute the same instruction stream on two or more processors in parallel. Such processors are said to execute two copies of the instruction stream "in lockstep," and therefore are referred to as "lockstepped processors." When the microprocessor is operating correctly (i.e., in the absence of soft errors), all of the lockstepped processors should obtain the same results because they are executing the same instruction stream. A soft error introduced in one processor, however, may cause the results produced by that processor to differ from the results produced by the other processor(s). Such systems, therefore, attempt to detect soft errors by comparing the results produced by the lockstepped processors after each instruction or set of instructions is executed in lockstep. If the results produced by any one of the processors differs from the results produced by the other processors, a fault is raised or other corrective action is taken. Because lockstepped processors execute redundant instruction streams, lockstepped systems are said to perform a "functional redundancy check."

One difficulty in the implementation of lockstepping is that it can be difficult to provide clock signals which are precisely in phase with each other and which share exactly the same frequency to a plurality of microprocessors. As a result, lockstepped processors can fall out of lockstep due to timing differences even if they are otherwise functioning correctly. In higher-performance designs which use asynchronous interfaces, keeping two different processors in two different sockets on the same clock cycle can be even more difficult.

Early processors, like many existing processors, included only a single processor core. A "multi-core" processor, in contrast, may include one or more processor cores on a single chip. A multi-core processor behaves as if it were multiple processors. Each of the multiple processor cores may essentially operate independently, while sharing certain common resources, such as a cache or system interface. Multi-core processors therefore provide additional opportunities for increased processing efficiency. In some existing systems, multiple cores within a single microprocessor may operate in lockstep with each other.

Although operating multiple processors or processor cores in lockstep increases the computer system's reliability by eliminating or mitigating the effects of soft errors, such increased reliability typically comes at the price of decreased performance. Because a pair of processors operating in lockstep with each other can only execute a single (duplicated) instruction stream, such a pair of lockstepped processors provides at most 50% of the throughput of a pair of non-lockstepped processors which process two distinct instruction streams in parallel.

What is needed, therefore, are techniques for providing the increased reliability afforded by lockstepped instruction execution without incurring the performance penalty typically incurred by systems which implement lockstepped instruction execution.

SUMMARY

In one aspect of the present invention, a circuit is provided which implements an instruction set architecture defining a first instruction group, a second instruction group to enter a high-reliability mode of operation, and a third instruction group to enter a non-high-reliability mode of operation. The circuit includes means for causing the circuit to enter the high-reliability mode of operation in response to receiving the second instruction group; means for causing the circuit to enter the non-high-reliability mode of operation in response to receiving the third instruction group; first execution means for executing the first instruction group in the high-reliability mode of operation if the circuit is in the high-reliability mode of operation; and second execution means for executing the first instruction group in the non-high-reliability mode of operation if the circuit is in the non-high-reliability mode of operation.

Other features and advantages of various aspects and embodiments of the present invention will become apparent from the following description and from the claims.

BRIEF DESCRIPTION OF THE DRAWINGS

FIG. 7A is a diagram of the generic bundle encoding template according to the Intel® Itanium® Processor Family architecture; and FIG. 7B is a diagram of a specific bundled encoding format according to the Intel® Itanium® Processor Family architecture.

DETAILED DESCRIPTION

Figure 1:
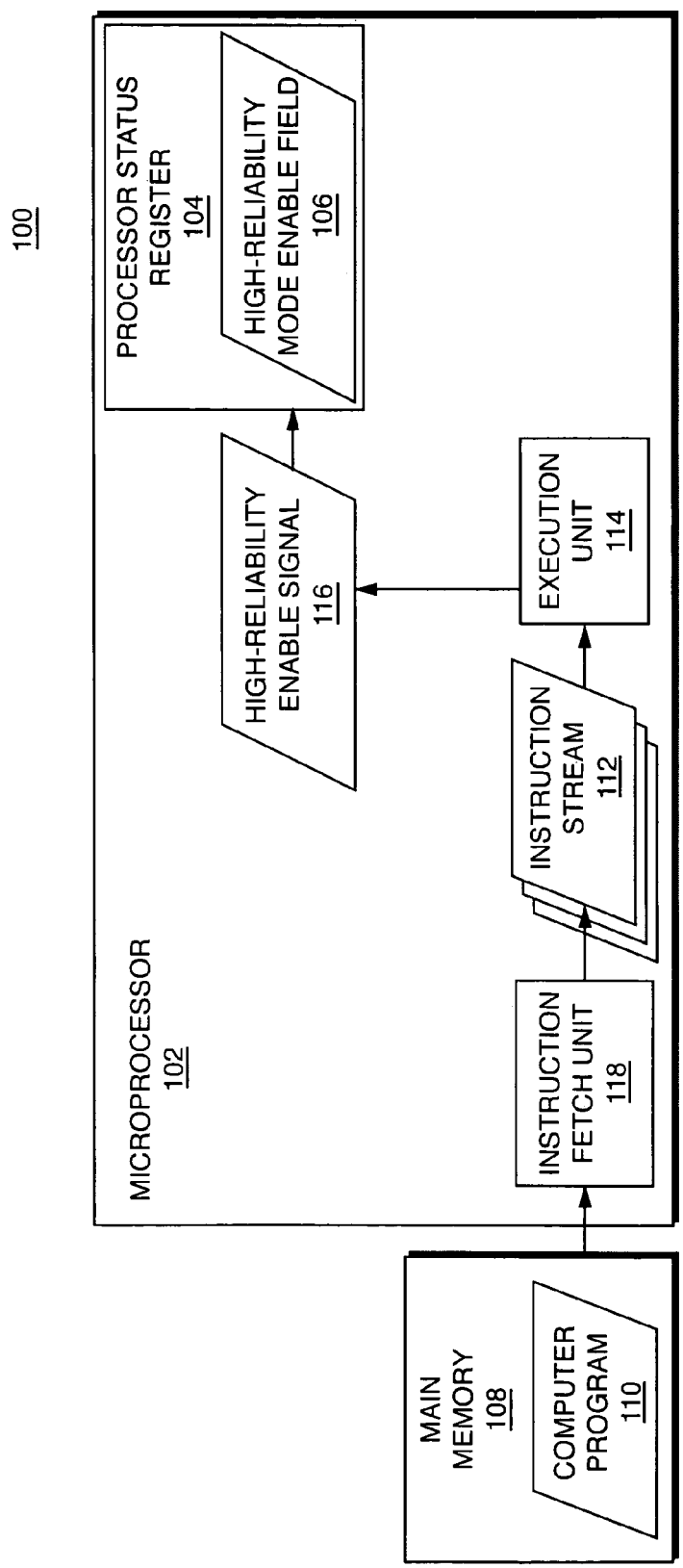
FIG. 1 is a computer system including a microprocessor which may operate in either a high-reliability mode or a normal mode according to one embodiment of the present invention.

The above-referenced patent applications entitled "Error Detection Method and System for Processors that Employ Lockstepped Concurrent Threads," and "Error Detection Method and System for Processors that Employ Alternating Threads" disclose examples of techniques for reducing the performance penalty caused by lockstepping by allowing lockstepping to be selectively enabled and disabled during the execution of an instruction stream. Such techniques enable a computer system to operate in a lockstep mode (in which the currently-executing instruction is executed in lockstep by two or more processors or cores) or a non-lockstep mode (in which the currently-executing instruction is not executed in lockstep) at any point in time.

In particular, the value of a field in a control register controls whether the computer system is to operate in lockstep mode or non-lockstep mode. The value of this lockstep mode field may be modified, for example, by the operating system or firmware. By enabling/disabling lockstep mode at appropriate points during execution of an instruction stream, selected portions of the instruction stream may be executed using lockstepping, while other selected portions of the instruction stream may be executed without using lockstepping. Particular critical portions of the instruction stream, for example, may be executed using lockstepping to obtain the increased reliability that lockstepping affords, while non-critical portions of the instruction stream may be executed without using lockstepping to obtain the increased performance provided by parallel and/or multithreaded processors or cores. By providing control over whether particular instructions are executed using lockstepping, such techniques enable the performance penalty associated with lockstepping to be incurred only for selected portions of the instruction stream, thereby decreasing the overall performance penalty in comparison to systems which require the entire instruction stream to be executed using lockstepping.

These techniques employ microarchitectural features of the microprocessor to control whether the microprocessor executes in lockstep mode. The term "microarchitectural" refers to features of the microprocessor which may vary from implementation to implementation and which therefore are not dictated by the architectural state of the microprocessor. The term "architectural state" refers to that subset of the state of a microprocessor which is operated upon by the instruction set of the processor. The architected state, therefore, is also referred to as the instruction set architecture (ISA) of the microprocessor. The architectural state may, for example, include the state of the microprocessor's registers.

Microarchitectural state may include, for example, the state of individual transistors or logic gates within the microprocessor. Different microprocessor implementations having the same instruction set architecture may differ in their microarchitectural features and, therefore, in their microarchitectural states while executing the same instruction stream.

The control register mentioned above may include a bit which indicates whether the microprocessor is to operate in lockstep mode. Although firmware or the operating system may set the value of such a "lockstep mode" bit through a variety of well-known techniques, the instruction set of the microprocessor does not include instructions for setting the value of the lockstep mode bit. Such a lockstep mode bit, therefore, represents a microarchitectural feature in the previous techniques described above. As a result, in such implementations the lockstepping mechanism is completely transparent to the processor's instruction set, and could change from one implementation of the microprocessor to the next.

Various embodiments of the present invention include techniques for enabling a microprocessor to execute a first subset of the instructions in an instruction stream in a high-reliability mode of operation, and to execute a second subset of the instruction in the instruction stream in a non-high-reliability (i.e, normal) mode of operation. The high-reliability mode may, for example, be a mode of operation in which instructions are executed using lockstepping, while the normal mode may be a mode of operation in which instructions are executed without lockstepping. The high-reliability mode may, however, be any mode of operation in which one or more instructions are executed with a higher degree of reliability than in the non-high-reliability mode. For example, techniques are disclosed in the above-referenced application entitled "Voltage Modulation for Increased Reliability in an Integrated Circuit," in which the operating voltage of an integrated circuit is increased when the circuit operates in a high-reliability mode.

In one embodiment, a microprocessor instruction set includes a first instruction for causing an execution unit of the microprocessor to execute subsequent instructions in high-reliability mode and a second instruction for causing the execution unit to execute subsequent instructions in normal mode. In another embodiment of the present invention, an encoding of a microprocessor instruction indicates whether to execute the instruction in high-reliability mode. In yet another embodiment, a template for a microprocessor instruction group whether the corresponding instruction group is to be executed in high-reliability mode. In such embodiments, the mechanism for enabling and disabling high-reliability mode forms part of the microprocessor's architectural state.

In one embodiment of the present invention, a microprocessor instruction set includes: (1) a first instruction (referred to herein as the "enter high-reliability mode" instruction) for causing the microprocessor to enter a high-reliability mode of operation; and (2) a second instruction (referred to herein as the "exit high-reliability mode" instruction) for causing the microprocessor to enter a non-high-reliability mode of operation, also referred to herein as a "normal mode" of operation. When operating the in the high-reliability mode of operation, the microprocessor may, for example, execute instructions in lockstep, such as by executing such instructions in multiple processors, processor cores, or threads. When operating in the normal mode of operation, the microprocessor may, for example, execute instructions without using lockstepping.

In one embodiment of the present invention, the "enter high-reliability mode" and "exit high-reliability mode" instructions are implemented as instructions in the Intel® Itanium® Processor Family (IPF) instruction set architecture. The IPF instruction set architecture is defined in Volume 1, Part 1, Chapter 3 of the "Intel® Itanium® Architecture Software Developer's Manual," Revision 2.1, published in October 2002 by Intel Corporation, and hereby incorporated by reference. Such instructions may be assigned any opcodes which are currently undefined in the IPF instruction set. These instructions may, for example, be implemented as "B"-type (branch) instructions according to the IPF instruction set architecture.

The "enter high-reliability mode" and "exit high-reliability mode" instructions may, for example, be implemented in a manner similar to existing instructions in the IPF instruction set for entering and exiting other modes of operation. For example, the IPF instruction set includes a "bank switch" instruction which has two forms: (1) a "zero form" (bsw.0), which causes the processor to use one bank of the integer register file by changing a processor status register bit; and (2) a "one form" (bsw.1), which causes the processor to use a second bank of the integer register file by changing a processor status register bit. Those having ordinary skill in the art will appreciate, based on the implementation of the "bank machine switch" instruction and the description herein, how to implement a "high-reliability mode switch" instruction having corresponding forms for entering and exiting high-reliability mode in accordance with the IPF instruction set architecture. The techniques disclosed herein are not, however, limited to use in conjunction with the IPF architecture, but rather may be used in conjunction with any microprocessor architecture.

The syntax of instructions in the IPF instruction set is defined in Part II, Section 2.3.1 of Volume 1 of the "Intel® Itanium® Architecture Software Developer's Manual," Revision 2.1, published in October 2002 by Intel Corporation, and hereby incorporated by reference. In relevant part, each instruction includes: (1) a mnemonic which specifies a name that uniquely identifies an Itanium instruction; and (2) a completer, which indicates an optional variation on the mnemonic. The "high-reliability mode switch" instruction may have a "zero form" which is expressed using the syntax hrsw.0, in which "hrsw" is the mnemonic and "0" is the completer. The "high-reliability mode switch" instruction may have a "one form" which is expressed using the syntax hrsw.1, in which "hrsw" is the mnemonic and "1" is the completer.

The use of a processor instruction having two forms is merely one way to implement the "enter high-reliability mode" and "exit high-reliability mode" instructions. Alternatively, the "enter high-reliability mode" may be implemented by a processor instruction having a first mnemonic, and the "exit high-reliability mode" instruction may be implemented by a processor instruction having a second mnemonic. As another alternative, the "enter high-reliability mode" and "exit high-reliability mode" instructions may be implemented using a single processor instruction have a single mnemonic, but which accepts an argument which indicates whether the instruction is to be interpreted as an "enter" or "exit" instruction. Those having ordinary skill in the art will appreciate how to implement the "enter high-reliability mode" and "exit high-reliability mode" instructions in other ways.

Referring to FIG. 1, a diagram is shown of a computer system 100 including a microprocessor 102 which may operate in either a high-reliability mode or a normal mode according to one embodiment of the present invention. The instruction set architecture of the microprocessor 102 defines a first instruction for causing the microprocessor 102 to enter the high-reliability mode of operation and a second instruction for causing the microprocessor to exit the high-reliability mode of operation (and thereby to enter the normal mode of operation).

The microprocessor 102 includes a processor status register (PSR) 104. The PSR 104 contains various configuration bits for the architecture. The PSR 104 includes a "high-reliability mode enable" field 106 which indicates whether the microprocessor 102 is to operate in high-reliability mode. The high-reliability mode enable field 106 may, for example, occupy a single bit in the PSR. The use of a single bit in the PSR 104 to implement the high-reliability mode enable field 106, however, is only an example and does not constitute a limitation of the present invention. For example, the microprocessor 102 may include a plurality of cores, in which case the microprocessor 102 may include a plurality of high-reliability mode enable fields, each of which indicates whether a corresponding one of the plurality of cores is to operate in high-reliability mode. Alternatively, each of the plurality of high-reliability mode enable fields may indicate whether a corresponding thread in the microprocessor 102 is to operate in high-reliability mode.

Furthermore, the high-reliability mode enable field 106 need not be implemented as a bit or other field in the PSR 104. Rather, the high-reliability mode enable field 106 may, for example, be implemented as a field in a machine-specific register (MSR), which may have a scope corresponding to the entire computer system 100, a single processor, a single core, or a single thread. The microprocessor 102 may, for example, include a plurality of processor cores, each of which includes an MSR with a "high-reliability mode enable" field indicating whether high-reliability mode is enabled for the corresponding processor core. In this way, high-reliability mode may be selectively enabled on a per-core basis. Similar use of MSRs may enable high-reliability mode to be selectively enabled on a per-processor or per-thread basis.

The computer system 100 also includes a main memory 108 containing at least one software program 110. As is well-known to those of ordinary skill in the art, the main memory 108 may be implemented in any of a variety of memory components (including, for example, RAM and hard disks) but is made accessible to the microprocessor 102 via a single contiguous address space which enables the microprocessor 102 to access the memory 108 in a manner that is independent of the physical implementation of the memory 108.

The microprocessor 102 includes an instruction fetch unit 118 which fetches instructions from the computer program 110 to produce an instruction stream 112 which is provided to an execution unit 114 in the microprocessor 102. Although the microprocessor 102 typically includes components in addition to the instruction fetch unit 118 and execution unit 114, such additional components are not relevant to the present discussion and therefore are not illustrated in FIG. 1. A more detailed description of the manner in which instructions may be fetched and provided to the execution unit 114 may be found in the above-referenced patent application entitled, "Error Detection Method and System for Processors that Employ Alternating Threads."

The execution unit 114 executes the instructions in the instruction stream 112. The execution unit 114 may, for example, be a floating point unit, an integer unit, an arithmetic logic unit (ALU), a multimedia unit, or a branch unit. Furthermore, although only one execution unit 114 is shown in FIG. 1 for ease of illustration, the microprocessor 102 may include a plurality of execution units, such as one of each of the kinds of execution units just mentioned. Techniques that may be used by an execution unit to execute instructions in an instruction stream are well-known to those of ordinary skill in the art, and examples of techniques that may be used by an execution unit to execute an instruction stream using lockstepping are described in the above-referenced patent application entitled "Error Detection Method and System for Processors that Employ Alternating Threads."

Figure 2:
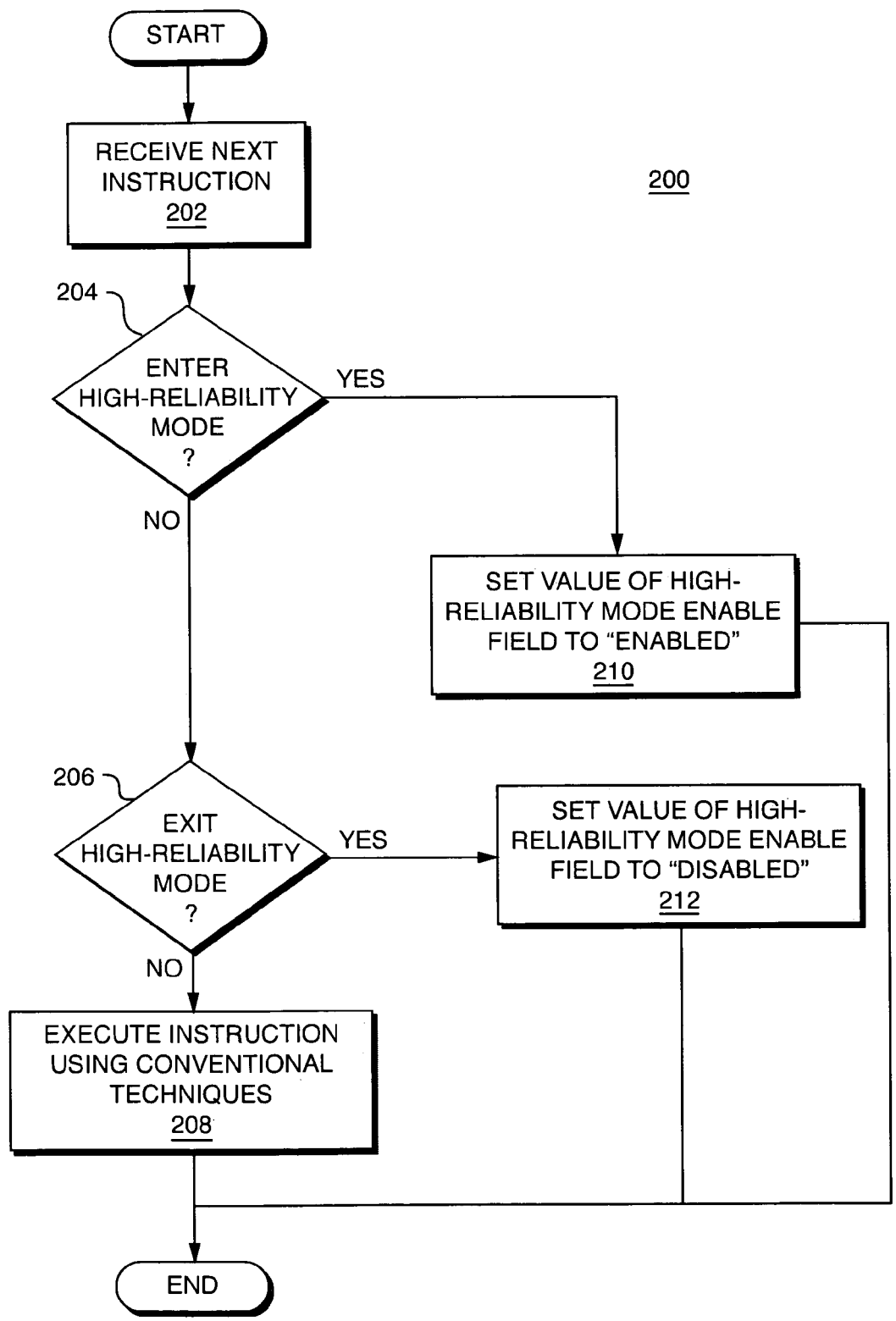
FIG. 2 is a flowchart of a method that is performed by the execution unit of FIG. 1 to enter and exit high-reliability mode in response to "enter high-reliability mode" and "exit high-reliability mode" instructions, respectively, according to one embodiment of the present invention.

Referring to FIG. 2, a flowchart is shown of a method 200 that is performed by the execution unit 114 to enter and exit high-reliability mode in response to the "enter high-reliability mode" (e.g., hrsw.1) and "exit high-reliability mode" (e.g., hrsw.0) instructions, respectively, according to one embodiment of the present invention. Note that the method 200 may be applied to the entire processor 102, to one or more processor cores, or to one or more threads executing in the processor 102. As a result, multiple cores and/or threads may enter and exit high-reliability mode independently of each other.

The execution unit 114 receives the next instruction in the instruction stream 112 (step 202). The execution unit 114 determines whether the instruction is an "enter high-reliability mode" instruction (step 204). If the instruction is an "enter high-reliability mode" instruction, the execution unit 114 sets the value of the high-reliability mode enable field 106 to a value of "enabled" (e.g., one) by transmitting a high-reliability mode enable signal 116 with an appropriate value to the processor status register 104 (step 210), thereby causing the microprocessor 102 to enter high-reliability mode.

If the instruction received in step 202 is not an "enter high-reliability mode" instruction, the execution unit 114 determines whether the instruction is an "exit high-reliability mode" instruction (step 206). If the instruction is an "exit high-reliability mode" instruction, the execution unit 114 sets the value of the high-reliability mode enable field 106 to a value of "disabled" (e.g., zero) by transmitting the high-reliability mode enable signal 116 with an appropriate value to the processor status register 104 (step 212), thereby causing the microprocessor 102 to exit high-reliability mode.

If the instruction received in step 202 is neither an "enter high-reliability mode" instruction nor an "exit high-reliability mode" instruction, then the execution unit 114 may execute the instruction using conventional techniques that are well-known to those having ordinary skill in the art (step 208).

Figure 3:
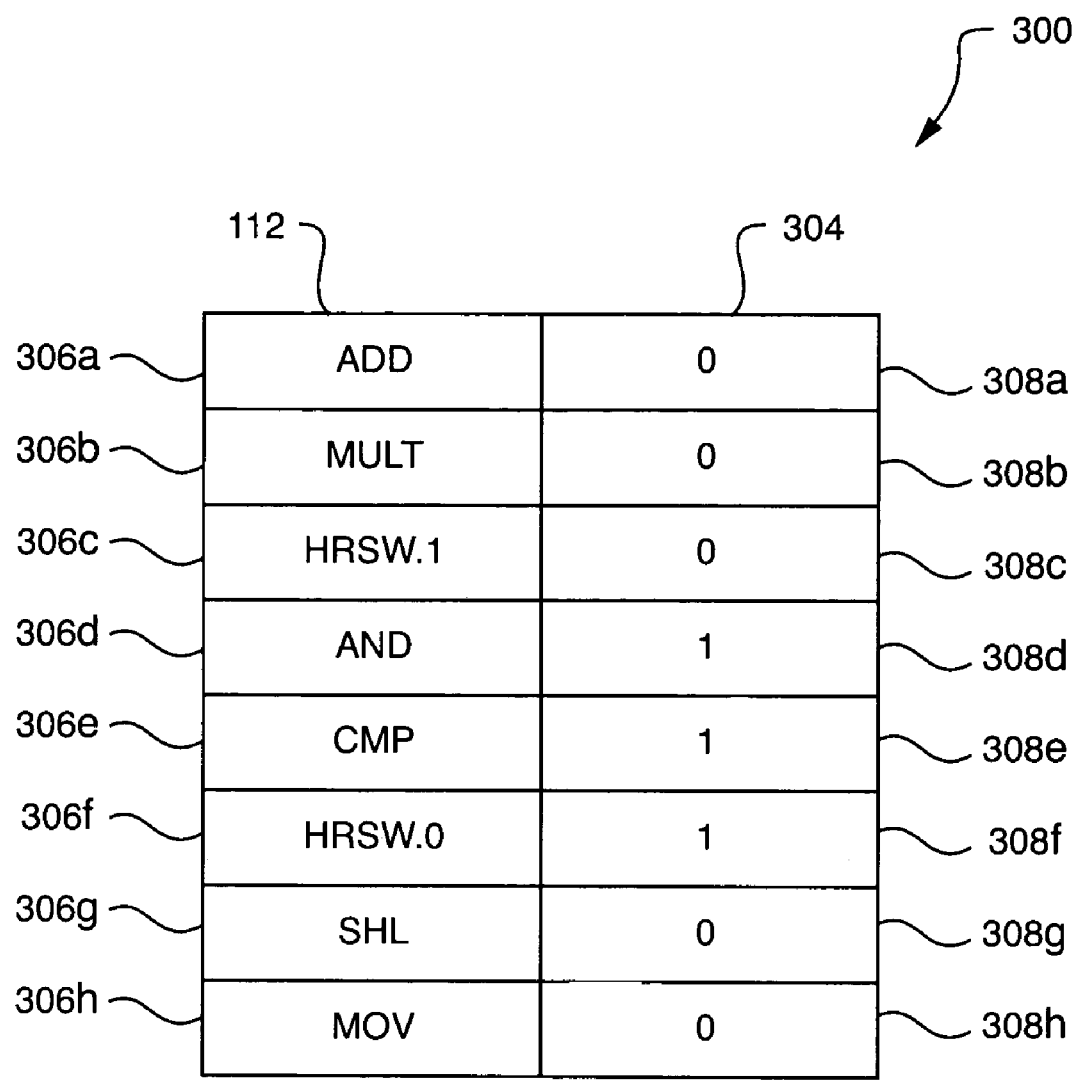
FIG. 3 is a diagram of an example instruction stream processed by the method of FIG. 2 according to one embodiment of the present invention.

In summary, the method 200 causes the microprocessor 102 to enter and exit high-reliability mode in response to execution of instructions which are part of the microprocessor's instruction set. Referring to FIG. 3, an example of the instruction stream 112 is shown which includes eight instructions 306a-h. For ease of illustration, only the mnemonic for each of the instructions 306a-h is shown. Furthermore, the mnemonics for all of the instructions 306a-h (except for instructions 306c and 306f) were selected arbitrarily and merely for purposes of example.

Also illustrated in FIG. 3 is a set 304 of values 308a-h of the high-reliability mode enable field 106 prior to execution of each of the instructions 306a-h, in which a value of zero and one indicate that high-reliability mode is disabled and enabled, respectively.

High-reliability mode is disabled prior to execution of the first instruction 306a, as indicated by the zero value 308a of the high-reliability mode enable field 106. Because instruction 306a is an ADD instruction, execution of instruction 306a does not affect the value of the high-reliability mode enable field 106. Therefore, the value 308b of the high-reliability mode enable field 106 is still zero prior to execution of the second instruction 306b, which is a multiply instruction and therefore does not affect the value of the high-reliability mode enable field 106. The high-reliability mode enable field 106 therefore retains a zero value 308c prior to the execution of instruction 306c.

Instruction 306c, however, is an "enter high-reliability mode" instruction (hrsw.1), which causes the value 308d of the high-reliability mode enable field 106 to be set to "enable" (e.g., 1), and therefore causes the microprocessor 102 to enter high-reliability mode, prior to execution of the next instruction 306d.

Instructions 306d and 306e are not high-reliability mode switch instructions and therefore do not affect the values 308e-f of the high-reliability mode enable field 106 prior to execution of instructions 306e-f, respectively. Instructions 306d-e, therefore, are executed by the microprocessor 102 in high-reliability mode.

Instruction 306f, however, is an "exit high-reliability mode" instruction (hrsw.0), which causes the value 308g of the high-reliability mode enable field 106 to be set to "disable" (e.g., 0), and therefore causes the microprocessor 102 to exit high-reliability mode, prior to execution of the next instruction 306g.

Instruction 306g is not a high-reliability mode switch instruction and therefore does not affect the value 308h of the high-reliability mode enable field 106 prior to execution of instruction 306h. Instructions 306g-h, therefore, are executed by the microprocessor 102 in normal mode.

In another embodiment of the present invention, the value of an encoded instruction indicates whether to execute the instruction in high-reliability mode. The term "encoded instruction" refers to an instruction as represented in the binary encoding format defined by the microprocessor architecture. For example, in the IPF instruction set architecture, instructions may be represented textually by an opcode and a completer, among other elements. The opcode may be encoded in a set of four bits and the completer encoded in a single bit. A complete encoded IPF instruction consists of 41 bits, including the 4-bit encoded opcode and the 1-bit encoded completer. The 41-bit format of IPF instructions is described in more detail in Volume 3, Part 1, Chapter 4 of the "Intel® Itanium® Architecture Software Developer's Manual," Revision 2.1, published in October 2002 by Intel Corporation, and hereby incorporated by reference. The IPF instruction encoding format, however, is merely an example and does not constitute a limitation of the present invention.

The value of an encoded instruction may indicate whether the instruction is to be executed in high-reliability mode in any of a variety of ways. For example, a single bit having a particular position in the encoded instruction may be defined as a "high-reliability mode" bit. If the "high-reliability mode" bit is equal to a first value (e.g., 1) in an encoded instruction, then the instruction may be executed in high-reliability mode. If the "high-reliability mode" bit is equal to a second value (e.g., 0), then the instruction may be executed in normal mode.

Figure 4A:
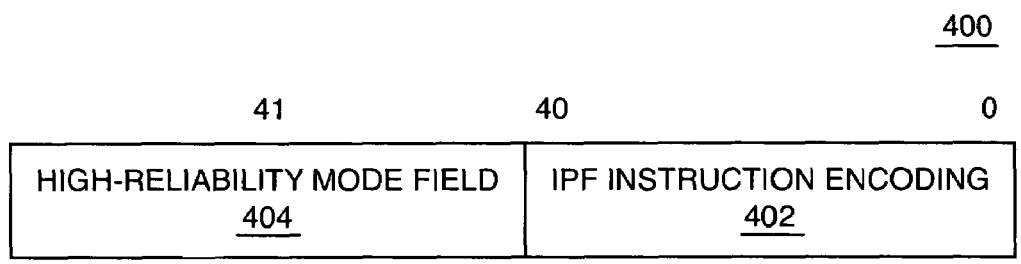
FIG. 4A is a diagram illustrating an encoded microprocessor instruction which includes a "high-reliability mode" field according to one embodiment of the present invention.

For example, referring to FIG. 4A, a diagram is shown illustrating an encoded microprocessor instruction 400 which includes a "high-reliability mode" field 404 according to one embodiment of the present invention. In the example illustrated in FIG. 4A, the remainder 402 of the instruction 400 is encoded in the manner defined by the IPF architecture. Note that the format of the IPF instruction encoding portion 402 of the instruction 400 may vary from instruction to instruction, because the format of IPF encodings varies among instruction types, except for the fact that the opcode is always encoded in bits 40:37.

By adding the additional high-reliability mode field 404 to the IPF instruction encoding 402, any IPF instruction can be designated to execute in high-reliability or normal mode by storing an appropriate value in the high-reliability mode field 404, regardless of the format of the IPF instruction portion 402. The encoded instruction 400 may, therefore, represent any instruction in the IPF architecture.

The IPF instruction set architecture is provided merely as an example and does not constitute a limitation of the present invention. A "high-reliability mode" field may similarly be appended to any pre-existing instruction encoding.

In one embodiment of the present invention, the instruction encoding 400 is 4 bits wide, including the 4.1-bit wide IPF instruction portion 402 and the 1-bit wide high-reliability mode field 404. The high-reliability mode field 404 may, however, be wider than one bit.

Figure 5:
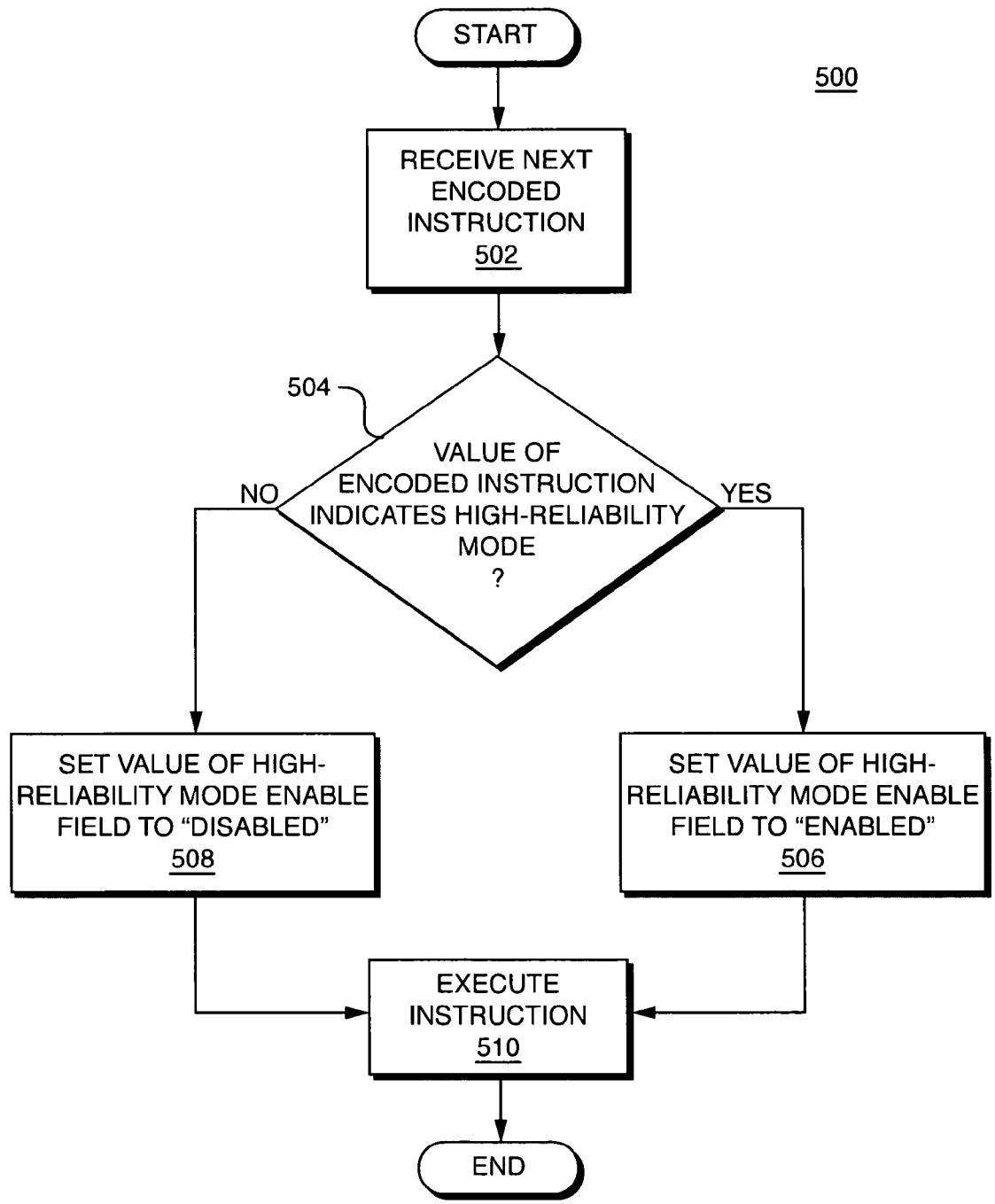
FIG. 5 is a flowchart of a method that is performed by the execution unit of FIG. 1 to execute an encoded instruction in high-reliability mode or normal mode depending on the value of the encoded instruction according to one embodiment of the present invention.

Referring to FIG. 5, a flowchart is shown of a method 500 that is performed by the execution unit 114 to execute an encoded instruction in high-reliability mode or normal mode depending on the value of the encoded instruction according to one embodiment of the present invention. The execution unit 114 receives the next encoded instruction (step 502). The execution unit 114 determines whether the value of the encoded instruction indicates that the encoded instruction should execute in high-reliability mode (step 504).

If the execution unit 114 determines that the value of the encoded instruction indicates that the encoded instruction should execute in high-reliability mode, the execution unit 114 sets the value of the high-reliability mode enable field to a value of "enabled" in the manner described above (step 506). If the execution Unit 114 determines that the value of the encoded instruction indicates that the encoded instruction should not execute in high-reliability mode, the execution unit 114 sets the value of the high-reliability mode enable field 106 to "disabled" in the manner described above (step 508).

After performing step 506 or 508, the execution unit 114 executes the encoded instruction (step 510). It should be appreciated that the encoded instruction will be executed in either high-reliability mode or normal mode in step 510 depending on whether the value of the encoded instruction indicated that the encoded instruction should be executed in high-reliability mode.

The techniques just described enable high-reliability mode to be enabled/disabled on a per-instruction basis without the use of separate "enter high-reliability mode" or "exit high-reliability mode" instructions. Rather, the information specifying whether to execute an instruction in high-reliability mode is embedded in the encoded instruction itself.

If the encoded instruction is implemented in the manner illustrated in FIG. 4A, step 504 may be implemented by determining whether the value of the high-reliability mode field 404 is equal to a first predetermined value (e.g., 1) which indicates that the instruction 400 is to be executed in high-reliability mode, or whether the high-reliability mode field 404 is equal to a second predetermined value (e.g., 0) which indicates that the instruction 400 is to be executed in normal mode.

Although in the embodiment illustrated in FIG. 4A, an additional field is added to an existing encoded instruction, this is not a limitation of the present invention. If, for example, a particular instructing encoding includes an unused bit or bits, the unused bit or bits may be used to implement the "high-reliability mode" field 404 without increasing the total number of bits in the instruction 400. In other words, any bit or bits in an encoded instruction may be used to implement the high-reliability mode field 404.

The use of a distinct "high-reliability mode" field is not required, however, to enable an encoding of an instruction to indicate whether the instruction is to be executed in high-reliability mode. More generally, any set of encodings may be predefined as encodings of instructions which are to be executed in high-reliability mode. In other words, if E is the set of encodings of all instructions in a particular instruction set, then a first subset $E_0$ of instruction encodings from set E may be selected arbitrarily as "high-reliability mode" instruction encodings and a second subset $E_1$ of instruction encodings selected as "normal mode" instruction encodings. In such an embodiment, step 504 may be implemented by determining whether the encoded instruction received in step 502 is in the "high-reliability mode" set of instructions. The encoded instruction may then be executed in high-reliability mode if and only if the instruction is in the "high-reliability mode" set of instructions (steps 506-510).

The sets $E_0$ and $E_1$ may be defined in any of a variety of ways. Consider, for example, a case in which an instruction set includes unused opcodes. In other words, opcodes are represented in n-bit sequences, and at least some n-bit sequences do not define instructions. In such a case, unused opcodes may be used to define "high-reliability mode" versions of existing opcodes.

Figure 4B:
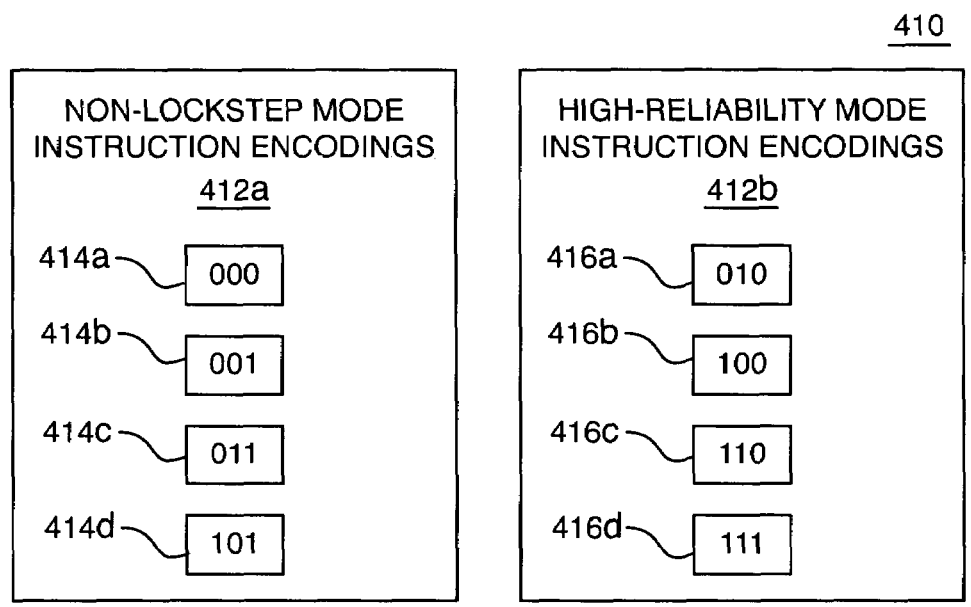
FIG. 4B is a diagram illustrating "high-reliability mode" instruction encodings and "normal mode" instruction encodings according to one embodiment of the present invention.

Consider, for purposes of a simplified example, a microprocessor which has four opcodes having the 3-bit encodings 000, 001, 011, and 101. In such an instruction set, there are four unused 3-bit opcode encodings (010, 100, 110, and 111). Such unused encodings may be interpreted as "high-reliability mode" versions of the corresponding opcodes. For example, referring to FIG. 4B, a diagram is shown illustrating a set of instruction encodings 410, including normal mode instruction encodings 412a and high-reliability mode instruction encodings 412b. The normal mode encodings 412a include encodings 414a-d, which were previously defined as encodings for the microprocessor's four opcodes. The high-reliability mode encodings 412b include encodings 416a-d, which were previously unused.

Each of the high-reliability mode encodings 416a-d may be treated as a high-reliability mode version of a corresponding one of the normal mode encodings 414a-d. For example, encoding 416a may be interpreted as a high-reliability mode version of encoding 414a; encoding 416b may be interpreted as a high-reliability mode version of encoding 414b; and so on.

Note that in such an implementation, there is no particular bit in an encoding which acts as a "high-reliability mode" bit. Rather, an arbitrary set of encodings are defined as "high-reliability mode" encodings. Furthermore, although in the example just provided there is a "high-reliability mode" encoding corresponding to each original "normal mode" encoding, this is not a requirement of the present invention. Rather, there may be "high-reliability mode" encodings for which there are no corresponding "normal mode" encodings, and vice versa, in which case the numbers of "high-reliability mode" and "normal mode" encodings may differ.

Figure 6:
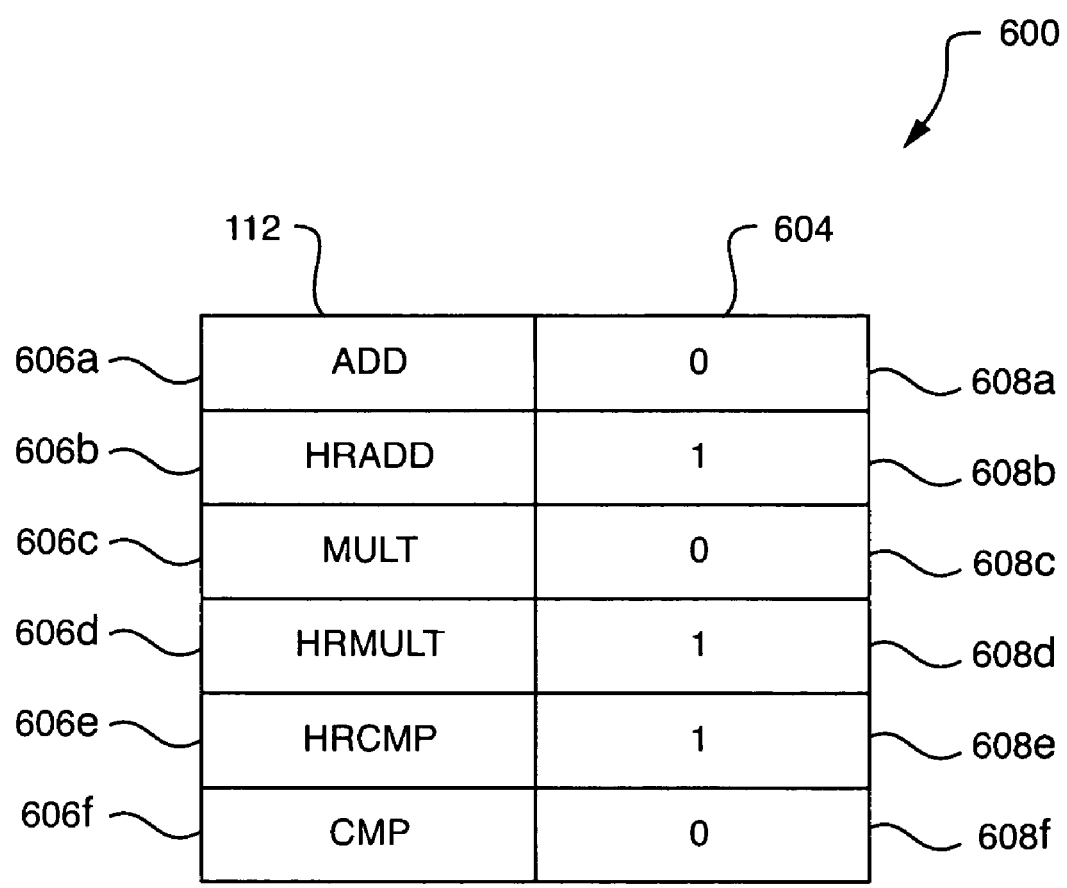
FIG. 6 is a diagram illustrating an instruction stream which is processed by the method of FIG. 5 according to one embodiment of the present invention.

Referring to FIG. 6, an example of the instruction stream 112 is shown which includes six instructions 606a-f. For ease of illustration, only the mnemonic for each of the instructions 606a-f is shown. Furthermore, the mnemonics for all of the instructions 606a-f were selected arbitrarily and merely for purposes of example.

Also illustrated in FIG. 6 is a set 604 of values 608a-f of the high-reliability mode enable field 106 during execution of each of the instructions 606a-f, in which a value of zero and one indicate that high-reliability mode is disabled and enabled, respectively.

In the example illustrated in FIG. 6, the mnemonics for "high-reliability mode" versions of instructions are prefixed with "HR". For example, the "high-reliability mode" version of the ADD instruction has the mnemonic HRADD, the "high-reliability mode" version of the MULT instruction has the mnemonic HRMULT, and the "high-reliability mode" version of the CMP instruction has the mnemonic HRCMP.

Because instruction 606a is a conventional ADD instruction, instruction 606a is executed in normal mode, as indicated by the value 308a of the high-reliability mode enable field 106. The next instruction 606b, however, is a "high-reliability mode" ADD instruction (HRADD), which therefore is executed in high-reliability mode, as indicated by the value 608b of the high-reliability mode enable field 106.

Because instruction 606c is a conventional MULT instruction, instruction 606c is executed in normal mode, as indicated by the value 308c of the high-reliability mode enable field 106. The next instruction 606d, however, is a "high-reliability mode" MULT instruction (HRMULT), which therefore is executed in high-reliability mode, as indicated by the value 608d of the high-reliability mode enable field 106.

Because instruction 606e is a "high-reliability mode" CMP instruction (HRCMP), instruction 606e is executed in high-reliability mode, as indicated by the value 608e of the high-reliability mode enable field 106. The next instruction 606f, however, is a conventional CMP instruction, which therefore is executed in normal mode, as indicated by the value 608f of the high-reliability mode enable field 106. FIG. 6 therefore illustrates an example in which high-reliability mode is enabled/disabled on a per-instruction basis without the use of separate "enter high-reliability mode" or "exit high-reliability mode" instructions. Rather, the information specifying whether to execute an instruction in high-reliability mode is embedded in the instruction itself.

The techniques disclosed above are not limited to use in conjunction with individual instructions. Rather, high-reliability mode may be enabled/disabled for groups of instructions. For example, microprocessors in the Intel® Itanium® Processor Family are examples of Explicit Parallel Instruction Computing (EPIC) processors. Such processors are capable of executing two "bundles" of instructions in each clock cycle. To achieve this, each processor includes multiple execution units capable of executing instructions in parallel.

Although each "bundle" defined according to the IPF architecture includes three instructions, the term "instruction group" refers herein more generally to a group of any number of instructions. For example, in the limiting case the term "instruction group" may refer to a single instruction, such as a single 41-bit instruction encoded according to the IPF instruction set architecture.

The IPF architecture defines a variety of formats, referred to as templates, for encoding bundles. A template may specify, for example: (1) "stops" within the bundle (i.e., the positions of individual instructions and other data within the bundle); and (2) the mapping of instructions within the bundle to execution unit types (i.e., the instruction type of each instruction within the bundle).

IPF template encoding formats are defined in Volume 3, Part 1, Chapter 4 of the "Intel® Itanium® Architecture Software Developer's Manual," Revision 2.1, published in October 2002 by Intel Corporation, and hereby incorporated by reference. Referring to FIG. 7A, a diagram is shown of the generic bundle template encoding format 700 of IPF bundles. The generic format 700 includes four fields 702a-d: (1) a 5-bit template field 702a; and (2) three 41-bit instruction slot fields 702b-d.

The IPF architecture also defines a plurality of specific template encoding formats for particular types of bundles. Each of these specific template encoding formats shares has the format of the generic template encoding format 700, but also: (1) includes a unique value in the template field 702a; and (2) specifies an instruction type for each of the instruction slots 702b-d. Instruction types include ALU, integer, memory, floating point, and branch. Instructions of each type are executed by a particular kind of execution unit in the microprocessor 102. For example, ALU-type instructions are executed by an ALU (arithmetic logic unit), while floating-point-type instructions are executed by a floating point execution unit. Although only the single execution unit 114 is shown in FIG. 1, the execution unit 114 may be implemented using a plurality of execution units of appropriate types. Furthermore, there may be two sets of such execution units for executing the two bundles that may be executed by the microprocessor 102 in parallel.

Referring to FIG. 7B, a diagram is shown illustrating one example of a conventional IPF bundle template encoding format 710. The value of template field 712a of the encoding 710 is 08 (hexadecimal). As mentioned above, each specific template encoding format specifies a unique value in the template field 702a to uniquely identify the encoding format. With a 5-bit template field 702a, there is a total of 32 ($2^5$) possible unique template encoding formats. In the particular template encoding format 710 illustrated in FIG. 7B, instruction slots 712b and 712c are specified to contain memory-type instructions to be executed by a memory execution unit. Instruction slot 712*d*, however, is specified to contain an integer-type instruction to be executed by an integer execution unit.

A particular bundle may be encoded in the format 710 shown in FIG. 7B by storing the value 08 in the bundle's template field, storing a memory-type instruction in its instruction slot field 712*b*, storing another memory-type instruction in its instruction slot field 712*c*, and storing an integer-type instruction in its instruction slot field 712*d*. When such an encoded bundle is received by the instruction fetch unit 118, the value of 08 in the template field 712*a* indicates to the instruction fetch unit 118 that the bundle has the format 710 illustrated in FIG. 7B. As a result, the instruction fetch unit 118 may dispatch each of the instructions in the bundle to the appropriate types of execution units (e.g., memory or integer).

Techniques disclosed above may be applied to systems which support instruction groups (e.g., bundles). For example, referring again to FIG. 2, the instruction received in step 202 may be an instruction group rather than a single instruction. The instructions in the instruction group may be executed (in step 208) in high-reliability mode (e.g., using lockstepping) or in normal mode (e.g., without using lockstepping), depending on whether the microprocessor 102 is in high-reliability mode at the time step 208 is performed.

Figure 4C:
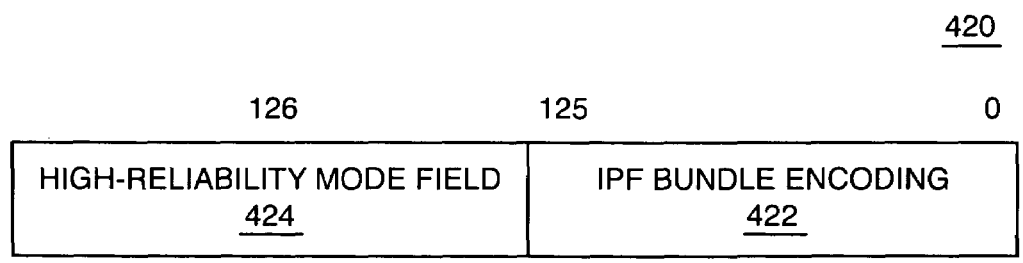
FIG. 4C is a diagram illustrating an encoded microprocessor instruction group which includes a "high-reliability mode" field according to one embodiment of the present invention.

Similarly, the value of an encoded instruction group (e.g., bundle) may indicate whether to execute the instructions in the instruction group in high-reliability mode. For example, in one embodiment of the present invention, an instruction group encoding includes a "high-reliability mode" field which indicates whether the instruction group is to be executed in high-reliability mode. Referring to FIG. 4C, a diagram is shown illustrating an encoded microprocessor instruction group 420 which includes a "high-reliability mode" field 424 according to one embodiment of the present invention.

In the example illustrated in FIG. 4C, the remainder 422 of the instruction group 420 is encoded in the manner defined by the IPF architecture. By adding the additional high-reliability mode field 424 to the IPF bundle encoding 422, any IPF bundle can be designated to execute in high-reliability or normal mode by storing an appropriate value in the high-reliability mode field 424, regardless of the format of the IPF bundle portion 422. The encoded bundle 420 may, therefore, be any bundle in the IPF architecture.

Alternatively, a sixth "high-reliability mode" bit may be added to the template field 702*a* of the generic template encoding format to indicate whether a particular bundle is to be executed in high-reliability mode. As another example, an existing bit in a bundle encoding may be used as a "high-reliability mode" bit. As yet another example, unused bundle template numbers may be used to specify "high-reliability mode" bundle templates. For example, in the IPF architecture, bundle template numbers (suitable for storage in the template field 702*a*) 06, 07, 14, 15, 1A, 1B, 1E, and 1F (all in hexadecimal) are unused, and may be used as template numbers for new bundles to be executed in high-reliability mode.

The IPF instruction set architecture is provided merely as an example and does not constitute a limitation of the present invention. A "high-reliability mode" field may similarly be appended to any pre-existing instruction group encoding.

Referring again to FIG. 5, the method 500 may receive an instruction group rather than a single instruction in step 502. Step 504 may be performed by determining whether the value of the encoded instruction group indicates that the instruction group is to be executed in high-reliability mode. Steps 506-508 may be performed in the same manner as described above. Finally, step 510 may be performed by executing all instructions in the instruction group. The method 500 may thereby be implemented to execute individual instructions and/or instruction groups in either high-reliability mode or normal mode depending on the encoded values of the instructions and/or instruction groups.

Among the advantages of the invention are one or more of the following.

By enabling/disabling high-reliability mode at appropriate points during execution of an instruction stream, selected portions of the instruction stream may be executed with increased reliability (e.g., by using lockstepping), while other selected portions of the instruction stream may be executed with a normal degree of reliability (e.g., without using lockstepping). Particular critical portions of the instruction stream, for example, may be executed in high-reliability mode to obtain the resulting increased reliability, while non-critical portions of the instruction stream may be executed in normal mode to avoid any disadvantages (e.g., performance penalties) associated with high-reliability mode. By providing control over whether particular instructions are executed in high-reliability mode, techniques disclosed herein enable any disadvantages (e.g., performance penalties) associated with high-reliability mode to be incurred only for selected portions of the instruction stream, thereby decreasing the overall performance penalty (or other disadvantage of high-reliability mode) in comparison to systems which require the entire instruction stream to be executed in high-reliability mode.

In particular, techniques disclosed herein provide instruction set support for enabling and disabling high-reliability mode. Adding high-reliability mode control to the instruction set architecture of a microprocessor enables control over high-reliability mode to be embodied in a program in a manner that is independent of the microarchitectural features of the microprocessor. For example, if a program includes instructions for enabling and disabling high-reliability mode at particular points in the program, instructions will continue to enable/disable high-reliability mode even if the program is ported to a different implementation of the microprocessor or the microarchitectural design of the microprocessor changes. This allows programmers to control the use of high-reliability mode easily and predictably, simply by using instructions in the microprocessor's instruction set.

Such techniques provide an advantage over systems which require the use of a processor interrupt to enable/disable high-reliability mode. Execution of microprocessor instructions, such as those described herein, typically incurs less overhead than required to service interrupts. Therefore, high-reliability mode may be enabled/disabled more efficiently than in systems which require interrupts to enable/disable high-reliability mode.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

What is claimed is:

1. A circuit comprising:
   means for receiving an instruction group, the instruction group comprising a plurality of fields;
   means for determining whether a predetermined one of the plurality of fields has a first predetermined value;
   first execution means for executing the instruction group in a high-reliability mode of operation if the predetermined one of the plurality of fields has the first predetermined value; and
   second execution means for executing the instruction group in a non-high-reliability mode of operation if the predetermined one of the plurality of fields does not have the first predetermined value.

2. The circuit of claim 1, wherein the instruction group consists of a single instruction.

3. The circuit of claim 1, wherein the first instruction group comprises a plurality of instructions.

4. The circuit of claim 1, wherein the first execution means comprises:
   a register comprising a "high-reliability mode" field having a modifiable value;
   means for modifying the value of the "high-reliability mode" field to an "enabled" value; and
   third execution means for executing the instruction group after modifying the value of the "high-reliability mode" field.

5. The circuit of claim 1, wherein the predetermined one of the plurality of fields consists of a single bit.

6. The circuit of claim 1, wherein the circuit comprises a microprocessor.

7. The circuit of claim 1, wherein:
   the first execution means comprises means for executing the instruction group using lockstepping if the instruction group includes the first predetermined value; and wherein
   the second execution means comprises means for executing the instruction group without using lockstepping if the instruction group does not include the first predetermined value.

8. A microprocessor comprising:
   means for receiving an instruction;
   means for determining whether a predetermined one of a plurality of bits in the instruction includes a first predetermined value;
   a register comprising a "high-reliability mode" field having a modifiable value;
   means for modifying the value of the "high-reliability mode" field to an "enabled" value if the instruction includes the first predetermined value;
   first execution means for executing the instruction group in a high-reliability mode of operation after the means for modifying modifies the value of the "high-reliability mode" field;
   second execution means for executing the instruction in a non-high-reliability mode of operation if the instruction group does not include the first predetermined value.

9. A computer-implemented method comprising steps of:
   (A) receiving an instruction group defined according to an instruction set architecture of a microprocessor, the instruction group comprises a plurality of fields;
   (B) determining whether a predetermined one of the plurality of fields in the instruction group has a first predetermined value;
   (C) executing the instruction group in a high-reliability mode of operation if the instruction group includes the first predetermined value; and
   (D) executing the instruction group in a non-high-reliability mode of operation if the instruction group does not include the first predetermined value.

10. The method of claim 9, wherein the instruction group consists of a single instruction.

11. The method of claim 9, wherein the first instruction group comprises a plurality of instructions.

12. The method of claim 9, wherein the step (C) comprises steps of:
   (C)(1) storing an "enabled" value in a "high-reliability mode" field of a register in the microprocessor;
   (C)(2) executing the instruction group after step (C)(1).

13. The method of claim 9, wherein the predetermined one of the plurality of fields consists of a single bit.

14. The method of claim 9, wherein:
   step (C) comprises a step of executing the instruction group using lockstepping if the instruction group includes the first predetermined value; and wherein
   step (D) comprises a step of executing the instruction group without using lockstepping if the instruction group does not include the first predetermined value.

15. A computer-implemented method comprising steps of:
   (A) receiving an instruction defined according to an instruction set architecture of a microprocessor;
   (B) determining whether a predetermined one of a plurality of fields in the instruction includes a first predetermined value;
   (C) storing an "enabled" value in a "high-reliability mode" field of a register in the microprocessor if the instruction includes the first predetermined value;
   (D) executing the instruction in a high-reliability mode of operation if the instruction includes the first predetermined value; and
   (E) executing the instruction in a non-high-reliability mode of operation if the instruction does not include the first predetermined value.

* * * * *

UNITED STATES PATENT AND TRADEMARK OFFICE
CERTIFICATE OF CORRECTION

PATENT NO. : 7,287,185 B2  Page 1 of 1
APPLICATION NO. : 10/819241
DATED : October 23, 2007
INVENTOR(S) : Kevin David Safford et al.

It is certified that error appears in the above-identified patent and that said Letters Patent is hereby corrected as shown below:

On the title page, item (54), in "Title", in column 1, line 2, after "OF" insert -- A --.

In column 1, line 2, in "Title", after "OF" insert -- A --.

In column 9, line 47, delete "4.1-bit" and insert -- 41-bit --, therefor.

In column 16, line 7, in Claim 9, delete "comprises" and insert -- comprising --, therefor.

Signed and Sealed this

Twenty-seventh Day of October, 2009

David J. Kappos
*Director of the United States Patent and Trademark Office*